US012692969B2

(12) United States Patent
Verdeil

(10) Patent No.: US 12,692,969 B2
(45) Date of Patent: Jul. 28, 2026

(54) MANUFACTURE OF PIPE-IN-PIPE ASSEMBLIES

(71) Applicant: Acergy France SAS, Suresnes (FR)

(72) Inventor: Julien Verdeil, Suresnes (FR)

(73) Assignee: ACERGY FRANCE SAS, Suresnes (FR)

( * ) Notice: Subject to any disclaimer, the term of this patent is extended or adjusted under 35 U.S.C. 154(b) by 451 days.

(21) Appl. No.: 18/268,581

(22) PCT Filed: Dec. 20, 2021

(86) PCT No.: PCT/IB2021/000902
§ 371 (c)(1),
(2) Date: Jun. 20, 2023

(87) PCT Pub. No.: WO2022/136919
PCT Pub. Date: Jun. 30, 2022

(65) Prior Publication Data
US 2024/0044440 A1 Feb. 8, 2024

(30) Foreign Application Priority Data
Dec. 21, 2020 (GB) ..................................... 2020303

(51) Int. Cl.
*F16L 9/18* (2006.01)
*F16L 53/38* (2018.01)
(Continued)

(52) U.S. Cl.
CPC .............. *F16L 59/029* (2013.01); *F16L 9/18* (2013.01); *F16L 53/38* (2018.01); *F16L 59/147* (2013.01)

(58) Field of Classification Search
CPC . F16L 59/029; F16L 9/18; F16L 53/38; F16L 59/147; F16L 9/042; F16L 9/147;
(Continued)

(56) References Cited

U.S. PATENT DOCUMENTS 3,853,149 A * 12/1974 Stine ...................... F16L 53/00
138/149
6,827,110 B2 12/2004 Watkins
(Continued)

FOREIGN PATENT DOCUMENTS

CN 108758110 5/2020
WO WO 2004/099554 11/2004
(Continued)

*Primary Examiner* — Amy J. Sterling
(74) *Attorney, Agent, or Firm* — MATTINGLY & MALUR, PC

(57) ABSTRACT

A pipe-in-pipe assembly comprises a bundled infill structure occupying an annulus between inner and outer pipes of the assembly. The infill structure is formed of a plurality of elongate elements laid along the inner pipe comprising a mixture of reinforcing elements and insulating elements. The reinforcing elements have greater mechanical resistance than the insulating elements to radial compression whereas the insulating elements provide greater thermal insulation than the reinforcing elements. Pluralities of the reinforcing elements are positioned together within the infill structure to form reinforcing formations, such as spacer formations, embedded between insulating regions of the infill structure that are defined by pluralities of the insulating elements.

32 Claims, 6 Drawing Sheets

(51) Int. Cl.
F16L 59/02 (2006.01)
F16L 59/147 (2006.01)

(58) Field of Classification Search
CPC ....... F16L 59/06; F16L 59/143; F16L 59/028;
F16L 11/08; F16L 9/04; F16L 59/02;
F16L 59/14
See application file for complete search history.

(56) References Cited

U.S. PATENT DOCUMENTS

| | | | |
|---|---|---|---|
| 7,226,243 B2 | 6/2007 | Lee et al. | |
| 8,919,092 B2 | 12/2014 | Figenschou et al. | |
| 9,863,571 B2 | 1/2018 | Critsinelis et al. | |
| 11,241,820 B2 | 2/2022 | Pionetti et al. | |
| 2013/0068340 A1* | 3/2013 | Chakkalakal | F16L 59/143 |
| | | | 138/149 |
| 2014/0230946 A1 | 8/2014 | Procida et al. | |

FOREIGN PATENT DOCUMENTS

| | | |
|---|---|---|
| WO | WO 2011/007083 | 1/2011 |
| WO | WO 2018/091814 | 5/2018 |

* cited by examiner

MANUFACTURE OF PIPE-IN-PIPE ASSEMBLIES

This invention relates to the manufacture of pipe-in-pipe (PiP) assemblies, for example as used for pipelines in the subsea oil and gas industry. The invention relates particularly to the challenges of simplifying and accelerating the manufacture of PiP assemblies.

In this specification, references to pipelines include multiple pipe joints and pipe stalks that are fabricated from a succession of pipe joints and that are then welded together, in turn, to form longer pipelines. For example, pipe stalks of up to a few kilometres in length may be manufactured at a coastal spoolbase in support of offshore reel-lay operations.

Pipelines may, for example, be used underwater as 'tie-backs' to transport crude oil and/or natural gas from a subsea wellhead across the seabed on the way to the surface, typically via a riser. Specifically, on production of hydrocarbons from a subsea well, the produced fluid emerges from the wellhead at high temperature and pressure and then enters a subsea pipeline. During subsequent transportation along the pipeline, the temperature and pressure of the produced fluid have to be kept high enough to ensure a sufficient flow rate across the seabed and up the riser. Thus, various measures are taken to ensure that the internal temperature of the pipeline remains high despite thermal exchange with the much colder surrounding seawater.

Designers of subsea pipelines have adopted both passive and active approaches to thermal management, either individually or in combination. In passive thermal management systems, the pipeline is thermally insulated to retain heat in fluids carried by the pipeline. Conversely, active thermal management systems add heat to the pipeline and to the fluids it carries.

A conventional PiP assembly is an example of passive thermal management, comprising a fluid-carrying inner pipe or flowline positioned concentrically within an outer pipe. The inner and outer pipes are spaced from each other, for example by longitudinally-distributed, radially-extending centralisers or spacers, to define a thermally-insulating annulus between them. Typically, layers or blankets of thermal insulation material are also disposed in the annulus, usually placed in the longitudinal gaps between spacers. It is also possible to draw down a partial vacuum in the annulus or to inject an insulating gas to reduce transmission of heat through the annulus.

As an example of active thermal management, a trace heating system typically employs resistive electrical cables running along, and in thermal contact with, the outer surface of a steel pipeline. The cables may extend in straight lines parallel to the central longitudinal axis of the pipeline, in a helix spiralling around the longitudinal axis, or in wavy pattern such as an 'S-Z' pattern that extends both circumferentially and longitudinally. Heat produced by passing an electric current along the cables is conducted through the pipe wall to the production fluid flowing within.

Electrically trace-heated PiP employs a combination of passive and active thermal management to manage the temperature of production fluids optimally. In particular, resistive electrical cables are disposed within the annulus between the inner and outer pipes, in thermal contact with the inner pipe. Typically, the cables are buried beneath, or radially within, thermal insulation material also disposed in the annulus. The cables may also pass through or beneath spacers, or other structures such as bulkheads or anodes, that extend radially across the annulus.

Auxiliary cables may also be installed along a pipeline, such as fibre-optic cables to carry data for communication, control or monitoring purposes, or conductive cables to convey electrical power along the pipeline. In a PiP assembly, such auxiliary cables may conveniently be accommodated within the annulus.

Installing spacers on top of wires or fibre-optic cables can compromise reliability if the transverse spacers pinch those longitudinal elements, particularly as the pipeline bends along its length. Also, gaps between spacers and adjacent panels or blankets of thermal insulation can generate significant thermal losses along the pipeline.

Another problem is that fixing a succession of spacers around an inner pipeline of a PiP assembly and then laying thermally-insulating blankets between the spacers requires stepwise, discontinuous processing and manual intervention by workers. This slows the pipeline manufacturing process and presents challenges of quality control. WO 2004/099554 attempts to address this issue by laying a continuous blanket along a pipeline between helical spacers. Specifically, elements of thermally-insulating aerogel are wrapped around the inner pipeline between helical spacers that extend radially to the height or thickness of the annulus. However, such monolithic spacers of large cross-section are difficult to manufacture and to install.

In U.S. Pat. No. 6,827,110, an insulated pipeline comprises an inner pipe and an outer polymer sleeve that is co-axial with the inner pipe. The inner pipe and the outer sleeve are spaced apart to define an annulus between them. A thermally-insulating core within the annulus comprises pre-cured, extruded, cylindrical syntactic elements and a binder that fills the interstices between those elements. However, this is not a PiP structure, as evidenced by the requirement for syntactic elements to resist hydrostatic pressure. Syntactic elements, an example of 'wet' insulation, are mechanically strong but are much less efficient as thermal insulators than more fragile 'dry' insulation materials, such as aerogels, which can be used in a PiP assembly whose outer pipe resists hydrostatic pressure.

U.S. Pat. No. 9,863,571 teaches filling the annulus of a PiP assembly with a plurality of hollow tubes or compartments whose primary purpose is thermal insulation. An outer encasement pipe made of composite material provides mechanical protection. However, reliance is placed upon the hollow tubes in the annulus to withstand radial compressive forces arising between the inner and outer pipes, for example as the assembly is bent along its length during spooling, unspooling, installation and use of a reel-lay pipeline. This is not feasible for the most efficient thermally insulating materials, such as aerogels, or for thin-walled tubes that aim to maximise gas-filled voids and to minimise heat transfer paths across the annulus.

US 2014/230946 describes a flexible pipe that includes armour layers and insulation layers.

U.S. Pat. No. 9,863,571 describes a subsea pipeline that includes an insulating layer formed by a plurality of elongate elements each containing an insulation material.

Highly-efficient thermal insulation materials and thin-walled tubes have insufficient crush strength to resist radial compression between the inner and outer pipes of a PiP assembly. Also, if crushed in that way, they would lose much of their insulative properties.

There remains a need to achieve high-performance thermal insulation without sacrificing too much mechanical strength. CN 108758110 recognises this need by placing a layer of tubes of oval cross-section within the annulus of a PiP assembly. The long axis of the oval cross-section of each tube extends radially to improve mechanical resistance to radial compression. However, the tubes are neither ideally strong nor ideally thermally insulating.

The fundamental problem therefore remains that materials and profiles with good mechanical performance lack thermal insulation performance and vice versa. At least one of those attributes, and usually both of those attributes, must be compromised. Not only do efforts to improve one attribute tend to worsen the other attribute; they also tend to complicate manufacture of the PiP assembly.

It is against this background that the present invention has been devised. From one aspect, the invention contemplates a pipe-in-pipe assembly comprising a bundled infill structure occupying an annulus between inner and outer pipes of the assembly, the infill structure being formed of a plurality of elongate elements laid along the inner pipe. The elongate elements of the infill structure comprise a mixture of reinforcing elements and insulating elements, the reinforcing elements having greater mechanical resistance than the insulating elements to radial compression whereas the insulating elements provide greater thermal insulation than the reinforcing elements. Pluralities of the reinforcing elements are positioned together within the infill structure to form reinforcing formations that are embedded between insulating regions of the infill structure defined by pluralities of the insulating elements.

The infill structure preferably comprises layers of the elongate elements laid on the inner pipe in radially-outward succession. In that case, the elongate elements of each layer may be angularly staggered relative to the elongate elements of each neighbouring layer. The reinforcing formations may incorporate fewer reinforcing elements in successive layers to taper in a radially outward direction.

The reinforcing formations preferably extend through a full radial thickness of the infill structure. Nevertheless, there may be a radial gap between the infill structure and the outer pipe, which gap is preferably continuous circumferentially around the infill structure and within the outer pipe.

The reinforcing formations may, for example, be spacer formations that are angularly spaced around the inner pipe and that extend radially from the inner pipe toward the outer pipe. The spacer formations may each comprise only reinforcing elements or a combination of the reinforcing elements and the insulating elements.

The elongate elements of the infill structure may further comprise one or more auxiliary elements whose primary purpose is to heat the inner pipe or to convey electrical current or data along the assembly. For example, one or more of the auxiliary elements may be a heating element that is in thermal contact with the inner pipe and that is surrounded by insulating elements of the infill structure. Alternatively, or in addition, one or more of the auxiliary elements may be a data cable that is separated from the inner pipe and from any heating element by at least one insulating element or reinforcing element of the infill structure.

The elongate elements may lie on mutually parallel paths, for example on helical paths, and may comprise groups of elements braided, knitted, wrapped, twisted, bonded or fused together.

The reinforcing elements may comprise tubes or rods whereas the insulating elements may comprise: hollow tubes; tubes filled with thermally insulating material; solid rods of thermally insulating material; or elements of a fibrous thermally insulating material. Where the reinforcing elements and the insulating elements are both tubular, the tubes of the insulating elements suitably have thinner walls than the tubes of the reinforcing elements.

The elongate elements of the infill structure could all be of substantially the same diameter or could increase in diameter in a radially-outward direction.

The inventive concept embraces a corresponding method of manufacturing a pipe-in-pipe assembly. The method comprises: forming a bundled infill structure around an inner pipe of the assembly by laying a plurality of elongate elements along the inner pipe; and inserting the inner pipe and the infill structure into an outer pipe of the assembly, the infill structure then occupying an annulus defined between the inner and outer pipes. The elongate elements of the infill structure comprise a mixture of reinforcing elements and insulating elements. The reinforcing elements are placed together within the infill structure to form reinforcing formations, each of those formations comprising a plurality of the reinforcing elements and being embedded between insulating regions of the infill structure defined by pluralities of the insulating elements.

Where the infill structure comprises layers of the elongate elements laid on the inner pipe in radially-outward succession, the reinforcing formations may be tapered in a radially outward direction by incorporating fewer reinforcing elements in successive layers.

Where the elongate elements of the infill structure further comprise one or more auxiliary elements, the method may comprise laying at least one heating element in thermal contact with the inner pipe and laying insulating elements over and surrounding the at least one heating element. The method may also, or alternatively, comprise laying at least one data cable on at least one inner layer of elongate elements, such as insulating elements, disposed between the data cable and the inner pipe.

Advantageously, the elongate elements laid on the inner pipe may be dispensed or unspooled from at least one reel of a winding machine. The elongate elements may be laid successively on the inner pipe at positions spaced longitudinally along the inner pipe. Alternatively, a plurality of the elongate elements may be grouped together at a common longitudinal and/or circumferential position on the inner pipe. For example, the elongate elements may be grouped by convergence from respective reels to the common position on the inner pipe, or may be grouped, for example by braiding, before being conveyed together to the inner pipe as a group.

The infill structure could be compacted by heating and/or by radially-inward compression before the inner pipe and the infill structure are inserted together into the outer pipe.

In summary, the invention improves prior art proposals of filling a PiP annulus with elongate thermal insulation elements such as tubes. Beneficially, the invention allows a PiP assembly to be manufactured using conventional winding machines as used for laying cables onto the external surface of a pipe or for fabricating umbilicals, for example as disclosed in U.S. Pat. No. 8,919,092, WO 2011/007083 and WO 2018/091814. This enables better utilisation of winding machines that are typically available at spoolbases. However, unlike the prior art, the invention also emulates the advantageous combination of mechanical strength and thermal insulation afforded by spacers and high-performance insulation materials that are used conventionally in the annulus of a PiP assembly.

Thus, the invention allows infill structures of a PiP annulus to be manufactured largely or completely by using a winding machine such as a helix machine. First, inner and outer pipes, typically in the form of pipe stalks or double pipe joints, are manufactured, usually by welding followed by anti-corrosion coating if the pipes are made of steel. In this respect, the inner pipe is typically of steel, whereas the outer pipe could be of steel or of a composite material. The outer pipe may also be lined to limit frictional resistance to insertion of the inner pipe into the outer pipe.

Before or during insertion of the inner pipe into the outer pipe, the inner pipe goes through one or more winding machines that lay elongate elements onto the inner pipe, for example helicoidally. Those elements may comprise: wires being tubes or rods of any rigid thermoplastic material such as polyamide or polypropylene, which may be of circular or other cross-sectional shape; wires or other elongate elements of dry insulation, such as braids or yarns of glass fibres offered, for example, by Ferlam Technologies; resistive heating wires; fibre-optic cables; communication wires; or anti-abrasion wires.

The final cross-section in the annulus is then a superposition of multiple layers of different wires or cables that are able to withstand mechanical loads while limiting thermal loss, with heating and/or monitoring being incorporated as required. For example, the cross-section of a centraliser or spacer formation could be a composite one, including some elements of insulation material in addition to mechanically-resistant elements, to limit thermal loss while ensuring load transfer.

The as-laid section can be adjusted to improve some properties, for example by going through a die to press elongate elements together and/or by heating to soften or melt at least some elongate elements or to fuse them together.

Foam-like thermal insulation could fill gaps between helical centralisers or strakes made of bundled wires. More generally, a filler or matrix material could be injected or otherwise placed to fill interstices between the elongate elements once laid.

The invention makes it possible to install a wire or cable in the annulus that is not necessarily in contact with the inner pipe. This may be advantageous to determine the temperature, humidity or atmospheric composition in the free annulus, to install a communication wire in a cold environment or to monitor load in a centraliser or spacer formation.

Embodiments of the invention implement a method to manufacture a PiP assembly that comprises an inner pipeline and an outer pipeline. The method comprises: providing a winding machine; moving the inner pipeline through the winding machine; unwinding superimposed layers of elongate elements from the winding machine onto the outer surface of the inner pipeline; and moving the inner pipeline inside the outer pipeline.

Embodiments of the invention also provide a PiP assembly comprising: an inner pipeline; an outer pipeline defining an annulus between the outer wall of the inner pipeline and the inner wall of the outer pipeline; and at least two layers of longitudinally elongate elements inside the annulus, laid along the inner pipeline. Some of those elements are relatively resistant to transverse compression and some of those elements are relatively thermally insulating.

Thus, the elongate elements may comprise elements such as wires of at least one thermally insulating material and other elements such as wires of at least one mechanically resistant material. Elongate elements may also comprise electric cables and/or fibre-optic cables. The elongate elements may all have the same diameter or may vary in diameter, for example from layer to layer.

The thermally insulating elements have substantially greater thermal insulation properties than the mechanically resistant elements. The thermally insulating elements may be solid or tubular and, in the latter case, they may comprise hollow or filled tubes. The tube walls and/or the tube filling may comprise polymeric, elastomeric or porous materials including polypropylene, silicones or aerogels.

The mechanically resistant elements are substantially more resistant to transverse compression than the thermally insulating elements. The mechanically resistant elements may comprise polymers and/or metals. They can be solid or tubular with a rigid outer wall or shell. If tubular, they may be hollow or may be filled with a material other than the material of the wall or shell.

The mechanically resistant elements may be arranged to form a spacer, such as a helical spacer, between the inner pipeline and the outer pipeline. The thermally insulating elements may be arranged to form layers, such as helical layers, between the spacers so that the inner pipeline is, substantially, totally covered by elongate elements in the circumferential cross-section. Nevertheless, a radial gap may exist between the outer pipeline and the top of the thermally insulating layers and/or the top of the spacer.

The elongate elements may be unwound helically around the inner pipeline or in a wave pattern such as an S-Z pattern. The elements could instead extend substantially parallel to the central longitudinal axis of the inner pipeline. In any event, the elements may be laid substantially parallel to each other. The elements are preferably laid in at least three layers, one layer around or on top of another layer.

Two or more elements may be grouped before laying, for example in braids, ropes, bundles or layers, and the groups may be laid parallel to each other or in helical, wave or straight configurations. The diameter of each group could be sufficient to fill the annulus without further layering, for example being substantially equivalent to the height of the annulus.

A winding machine for use in the invention may comprise a plurality of winding modules. The winding modules may be mounted on the same support and/or on a plurality of distinct supports. For example, winding modules may be spaced apart longitudinally in a direction of relative movement between the machine and the inner pipeline.

In order that the invention may be more readily understood, reference will now be made, by way of example, to the accompanying drawings in which:

FIG. 1 is a schematic side view of a pipeline production facility operating in accordance with the invention, showing winding modules on a first rotating support of a winding machine placing a first layer of elongate elements onto an inner pipeline of a PiP assembly;

FIG. 2 corresponds to FIG. 1 but shows winding modules on a second rotating support placing a second layer of elongate elements onto the inner pipeline, around the first layer, before the inner pipeline is inserted into an outer pipeline of the PiP assembly;

Figure 1:
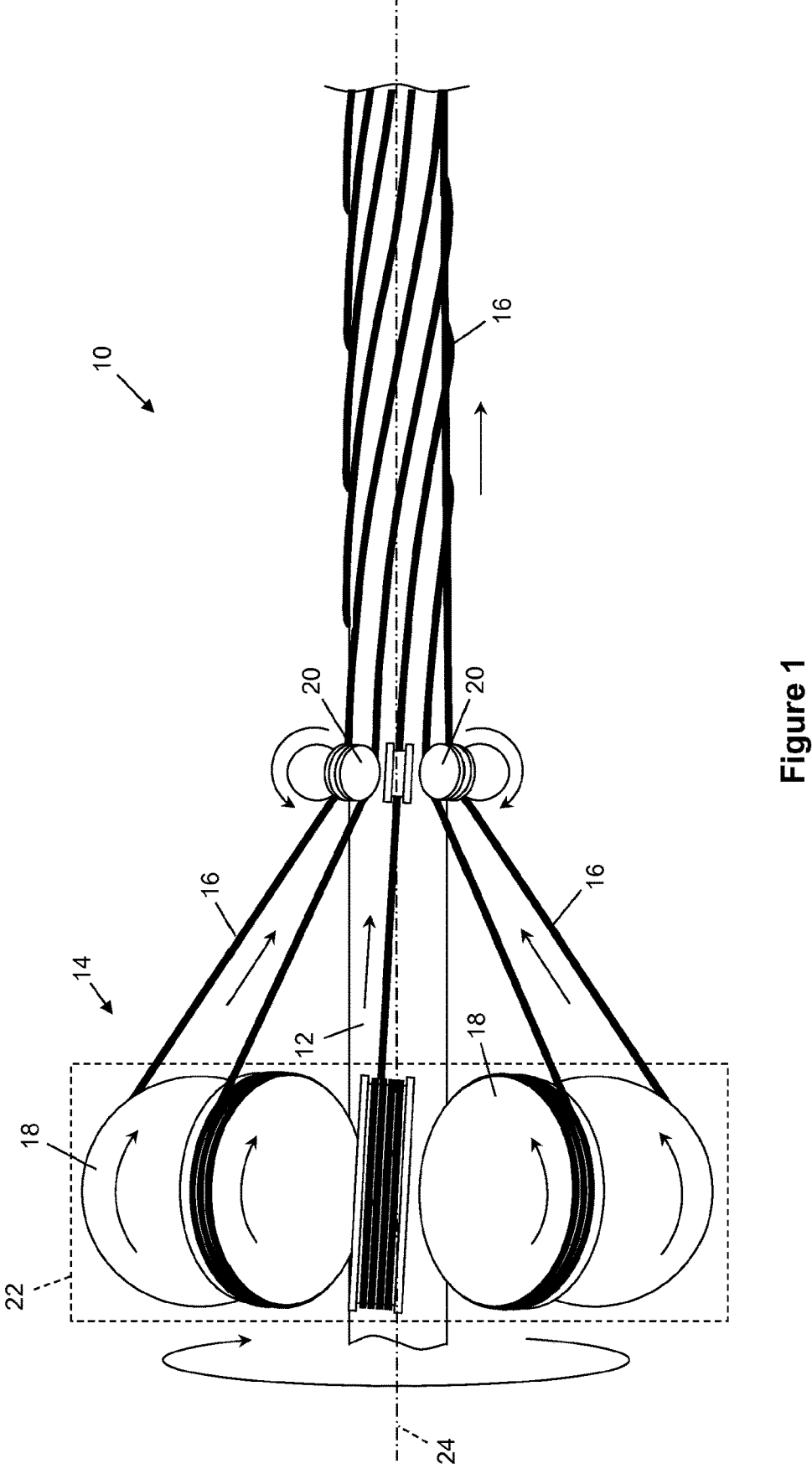
Figure 2:
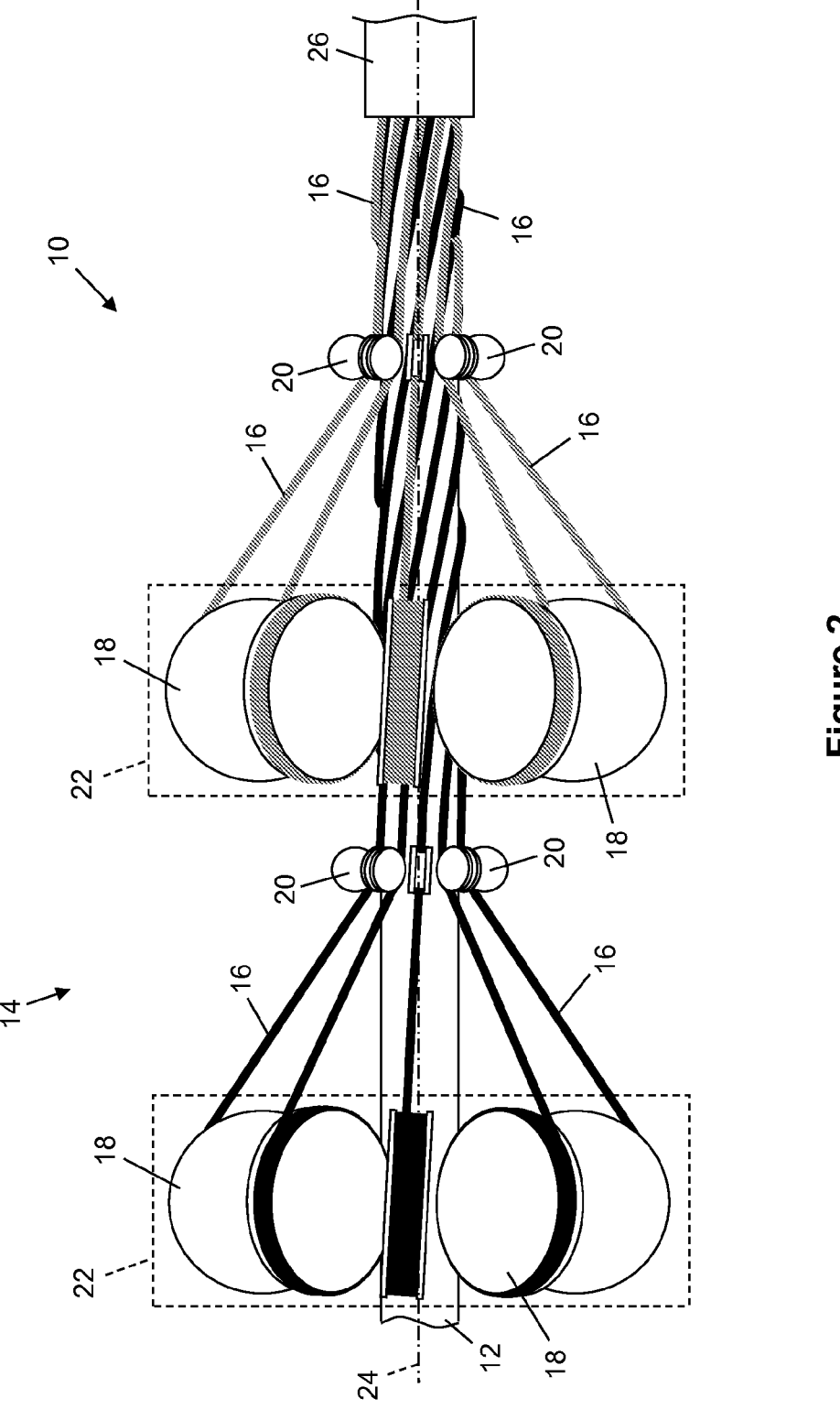

FIGS. 1 and 2, in which like numerals are used for like features, show a pipeline manufacturing facility 10, such as a coastal spoolbase, in which an inner pipeline 12 of a PiP assembly is shown advancing longitudinally from left to right through a winding machine 14. The pipeline 12 is typically fabricated by welding together a succession of steel pipe joints at an upstream location within the facility 10, not shown.

When the pipeline 12 reaches the winding machine 14 shown in FIGS. 1 and 2, elongate elements 16 are unspooled from reels 18 of respective winding modules and then are guided by respective guides 20 onto the outer surface of the pipeline 12 as the pipeline 12 continues to advance. There, the elements 16 may optionally be fixed in place by circumferential straps or other conventional fixings, not shown.

FIG. 1 shows a first layer of elements 16 being placed onto the pipeline 12. FIG. 2 shows a second layer of elements 16 being placed onto the pipeline 12 around, or on top of, the first layer of elements 16.

FIG. 1 shows, schematically, a rotating support 22 of the winding machine 14 that turns about the central longitudinal axis 24 of the pipeline 12 as the pipeline 12 advances through the winding machine 14. The support 22 carries the reels 18 of the winding modules in a circumferential array, equi-angularly spaced around the central longitudinal axis 24.

In this example, each reel 18 is tilted relative to the central longitudinal axis 24 so that the elements 16 of the first layer are wound onto the pipeline 12 in a helical arrangement, spiralling around the central longitudinal axis 24. In other examples, as noted previously, the elements 16 could follow wavy paths such as an S-Z pattern, or straight paths that are parallel to the central longitudinal axis 24 and to each other.

For simplicity of illustration, only eight reels 18 and their associated elements 16 are shown in this example, three of which are hidden behind the pipeline 12 and behind the five reels 18 that are visible in this view. In practice, there will be several more reels 18 and elements 16 so that the angular spacing between neighbouring elements 16 of the first layer is substantially less than is shown here. Indeed, preferably, there is substantially no angular spacing between neighbouring elements 16 of the first layer when they are placed on the pipeline 12.

FIG. 2 shows a second rotating support 22 of the winding machine 14 that turns about the central longitudinal axis 24 in the same direction as the first support 22 as the pipeline 12 advances through the winding machine 14. The second support 22 carries the reels 18 of additional winding modules in a circumferential array, also equi-angularly spaced around the central longitudinal axis 24. The reels 18 and their associated guides 20 place the elements 16 of the second layer onto the previously-laid first layer of elements 16 in a corresponding helical arrangement.

In principle, it would be possible for the elements 16 unspooled from the reels 18 of the second rotating support 22 to be interleaved between, rather than placed on top of, elements 16 previously placed from the reels 18 of the first rotating support 22. Thus, the second rotating support 22 could be used to infill any circumferential gaps that may remain between elements 16 of the first layer previously dispensed from the reels 18 of the first rotating support 22. In other words, the second rotating support 22 could be used to complete the first layer of elements 16 rather than initiating or placing a second layer of elements 16.

More generally, a succession of rotating supports 22, each carrying reels 18 of elongate elements 16, may be used to complete or to place each layer of elements 16 on the pipeline 12 until the desired number of layers, each with the desired density of elements 16, has been achieved.

In FIG. 2, the pipeline 12 carrying layers of elements 16 is shown being inserted telescopically into the outer pipe 26 of a PiP assembly. The outer pipe 26 may, for example, be more than 1.5 km long as part of a pipe stalk that will form part of a reel-laid pipeline.

Figures 3, 4, 5:
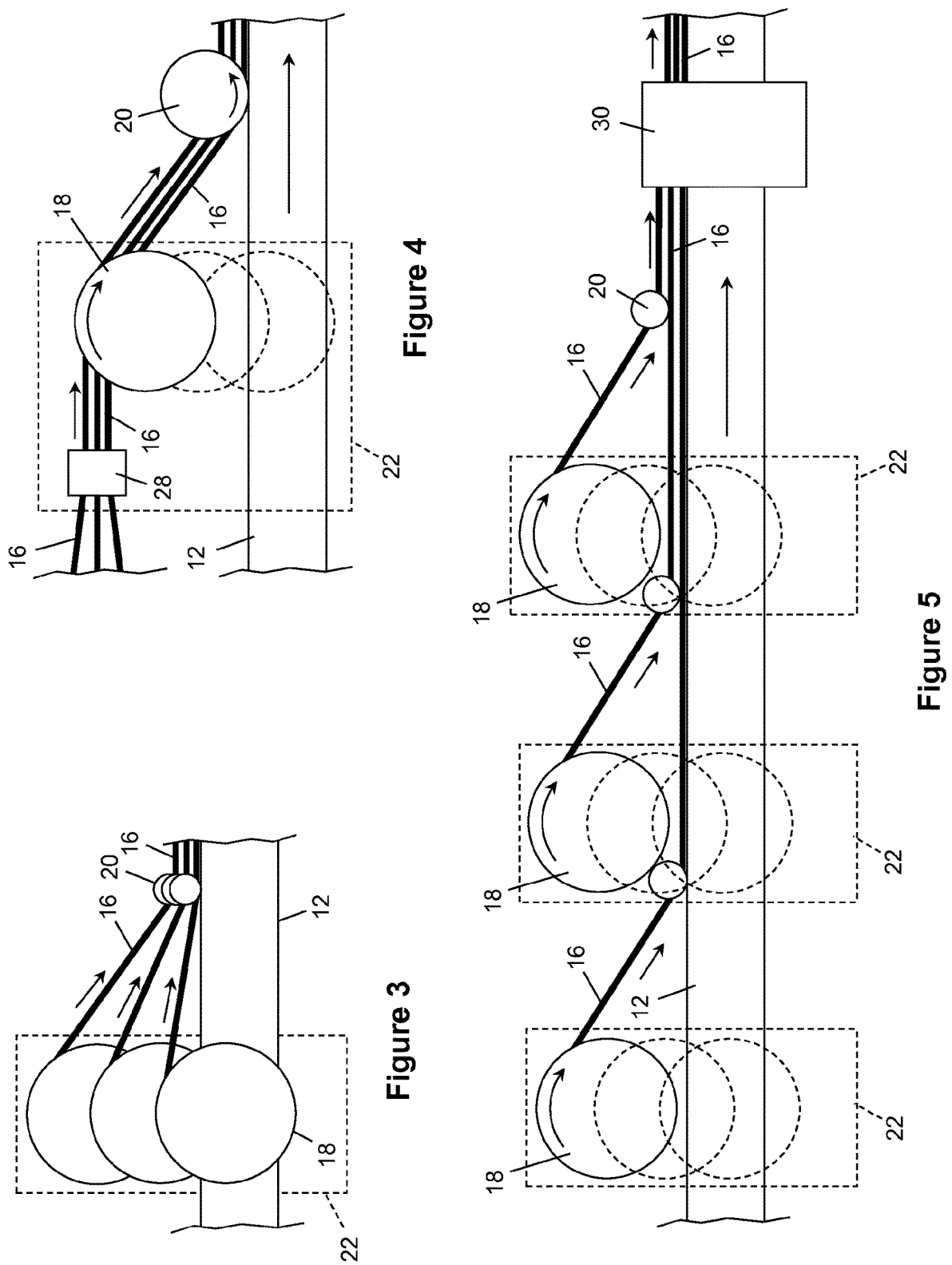
FIG. 3 is a schematic side view showing multiple winding modules on the same rotating support placing a corresponding number of layers of elongate elements onto an inner pipeline simultaneously.
FIG. 4 is a schematic side view showing elongate elements being grouped before a winding module on a rotating support places the group of elongate elements onto an inner pipeline.
FIG. 5 is a schematic side view showing winding modules on multiple longitudinally-spaced rotating supports placing respective elongate elements onto an inner pipeline in successive layers, followed by compaction of the layers.

FIGS. 3 to 5 show other ways of placing layers or groups of elongate elements 16 onto a pipeline 12. For simplicity, the elements 16 are shown in these drawings as following a straight path that is parallel to the longitudinal direction in which the pipeline 12 is advanced. However, a helical or otherwise curved path is possible instead, as described and illustrated above. In these examples, three layers are shown but additional layers or other groupings would be possible.

FIG. 3 shows that it is possible to place layered elements 16 onto the pipeline 12 simultaneously. In this example, this is achieved by directing the elements 16 from respective reels 18 of a common support 22 on convergent paths to guides 20 that apply the elements 16 to the pipeline 12 at a common longitudinal position, stacked in a layered arrangement.

FIG. 4 shows that separate elements 16 can be aggregated to form a group before the grouped elements are spooled together onto a reel 18 of a support 22. The grouped elements 16 are then dispensed together from the reel 18 and placed onto the pipeline 12 together via a common guide 20. The group of elements 16 may be thick enough, or may contain enough layers of elements 16, substantially to fill the annulus of a PiP assembly that comprises the pipeline 12.

As one example, the separate elements 16 can be aggregated by being braided together in a braiding machine 28 upstream of the reel 18. Thus, a braiding machine 28 is an example of an aggregating apparatus for bringing together separate elements 16 and joining them to form a group. More generally, the elements 16 can be knitted or twisted together, bundled, bonded, fused or wrapped by an aggregating apparatus to form a layered or non-layered group. The group of elements 16 remains flexible enough to be bent or twisted along its length while being guided to the pipeline 12, optionally via intermediate storage such as the reel 18, without buckling, crushing or otherwise damaging the elements 16.

The arrangement shown in FIG. 5 is akin to that shown in FIG. 2 in that layers of elements 16, from respective reels 18 on respective supports 22, are built up sequentially. The elements 16 are applied to the pipeline 12 and then to previously-placed layers of elements 16 at locations spaced longitudinally along the pipeline 12. In this example, however, the pipeline 12 carrying the layered elements 16 then passes through a compacting apparatus 30.

The compacting apparatus 30 may comprise a die that narrows in the direction of travel of the pipeline 12 to deform the cross-section of the elements 16 plastically and/or a heater that softens or melts at least an outer part of each element 16.

Figures 6A, 6B:
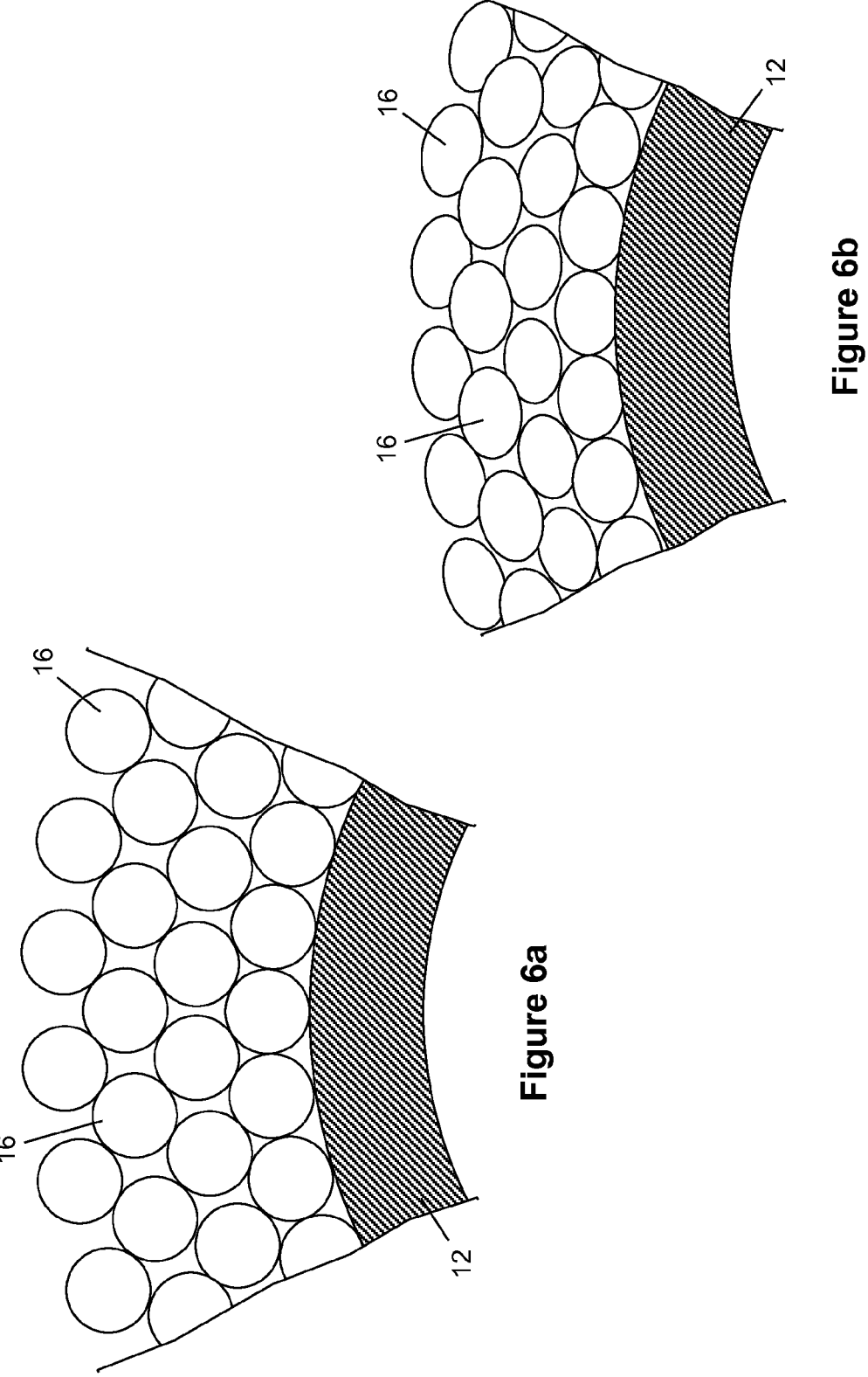
FIGS. 6a and 6b are schematic cross-sectional detail views through layered elements before and after compaction.

The effect of the compacting apparatus 30 is shown schematically in the before-and-after drawings of FIGS. 6a and 6b. Its effect is to deform, radially compact and circumferentially spread the elements 16, hence packing them together closely into more intimate contact with each other to forming a thinner and denser agglomeration.

Compacting may of course be applied in other manufacturing arrangements, such as those described with reference to the preceding drawings.

An advantage of the invention is the ability to manufacture and install a complete infill structure for a PiP annulus in a continuous automated process, as exemplified above. The infill structure of the invention satisfies all functional requirements that would conventionally require separate thermal insulation and spacers, in particular, thermal management and resistance to radial compression. The infill structure of the invention also satisfies the requirement to locate auxiliary elements such as heating wires or fibre-optic cables within the annulus.

Figure 7:
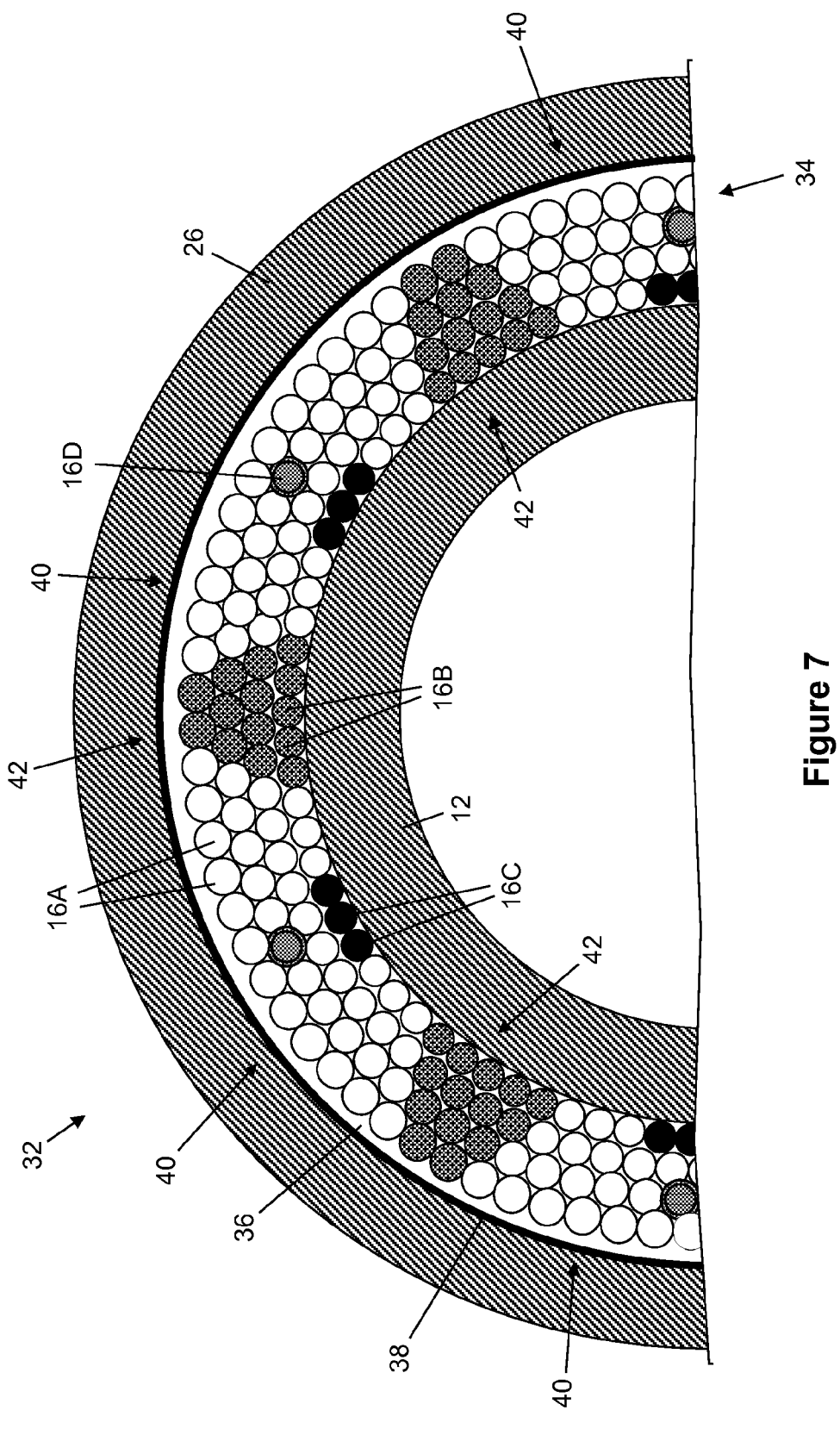
FIG. 7 is a schematic partial cross-sectional view through a PiP assembly of the invention.
Figure 8:
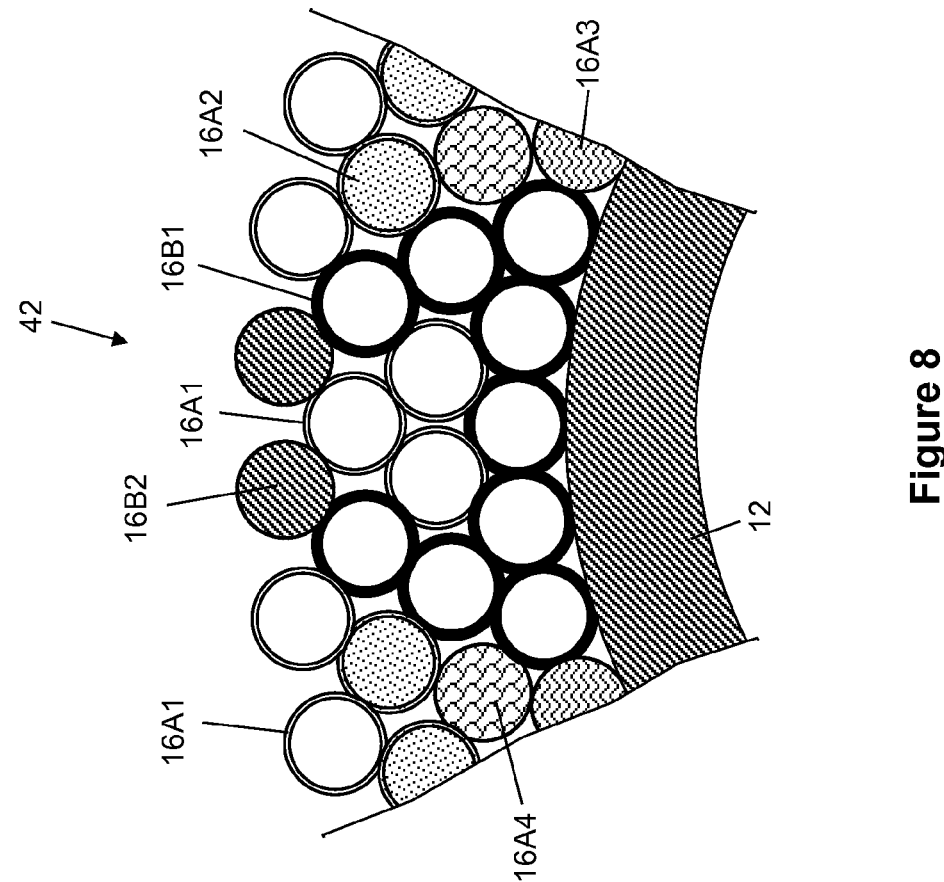
FIG. 8 is a schematic cross-sectional detail view showing various layered elements that may be placed on the inner pipe of a PiP assembly of the invention.

The invention achieves these objectives by selecting different types of elongate elements 16 to be laid in a mixed bundle of parallel elements 16 and combining and positioning those elements 16 within the infill structure appropriately. FIGS. 7 and 8 illustrate some of the possibilities of this approach.

In FIG. 7, a PiP assembly 32 of the invention comprises an inner pipe 12 spaced concentrically within an outer pipe 26, defining an annulus 34 between them. The annulus 34 contains an infill structure of the invention that comprises concentric layers, in this example four layers, containing various types of elongate elements 16.

Optionally, as shown, the outermost layer of elements 16 is spaced radially inwardly from the inner side of the outer pipe 26, leaving a radial, circumferentially-continuous gap 36 that interrupts conductive transmission of heat through the annulus 34. The inner side of the outer pipe 26 also has an optional low-friction coating 38 to ease insertion of the inner pipe 12 and the elements 16 into the outer pipe 26.

In this example, neighbouring layers of elements 16 are mutually staggered circumferentially, thus aligning or nesting each element 16 of one layer angularly between elements 16 of the next layer. This enables successive layers to interlock for increased rigidity. Also, the elements 16 increase slightly in diameter from layer to layer in radially outward sequence so that the elements 16 of all layers can bear against their neighbouring elements 16 in each layer without circumferential gaps between them.

Most of the elements 16 of the infill structure are primarily thermally insulating in their material(s) and/or their structure. Those insulating elements are designated 16A in FIG. 7. In several circumferential locations, the insulating elements 16A are stacked radially from the inner pipe 12 toward the outer pipe 26 through all layers of the infill structure. The stacked insulating elements 16A together form insulating regions 40 around the inner pipe 12.

Some of the elements 16 of the infill structure are primarily mechanically resistant in their material(s) and/or their structure, at least with respect to radial compression. Those mechanically resistant, reinforcing elements are designated 16B in FIG. 7.

It will be apparent from FIG. 7 that the reinforcing elements 16B are grouped together in circumferential alignment to form discrete reinforcing formations, specifically spacer formations 42, that extend radially from the inner pipe 12 toward the outer pipe 26 through all layers of the infill structure. The spacer formations 42 are angularly spaced around the annulus 34, in this example at 60° intervals. The spacer formations 42 are stabilised by the abutment of the reinforcing elements 16B with the adjoining insulating elements 16A, hence being embedded by or between the insulating regions 40.

In the example shown in FIG. 7, the spacer formations 42 taper radially outwardly to form a stable structure that minimises the heat transmission path through the annulus 34. This taper can be achieved by reducing the number of reinforcing elements 16B moving outwardly through each spacer formation 38 from one layer to the next, here reducing from five such elements 16B in the innermost layer to two such elements 16B in the outermost layer.

The example shown in FIG. 7 also comprises auxiliary elements 16, in this case heating wires 16C and fibre-optic cables 16D.

The heating wires 16C are grouped at equi-spaced angular locations within the insulating regions 40, alternating with the spacer formations 42. The heating wires 16C are part of the innermost layer of elements 16, hence being in thermal contact with the inner pipe 12. They are buried under one or more surrounding outer layers of insulating elements 16A.

The fibre-optic cables 16D are positioned in an intermediate layer of the infill structure within the insulating regions 40, the better to sense conditions in the body of the annulus 34. To the benefit of thermal isolation, the fibre-optic cables 16D are also separated from the heating cables 16C, and from the heated inner pipe 12, by at least one insulating element 16A or by at least one layer of such elements 16A.

The fibre-optic cables 16D are also equi-angularly spaced around the infill structure within the annulus 34, although this spacing is not essential. Also, some or all of the fibre-optic cables 16D could be replaced with other auxiliary elements 16 such as power cables or even fluid conduits.

In a variant of the arrangement shown in FIG. 7, mechanically-reinforcing elements 16B could be positioned immediately adjacent to the heating wires 16C and/or the fibre-optic cables 16D to protect them and/or the thermally insulating elements 16A locally, depending on the materials and future operational utilisations of the PiP assembly 32 and the heating cables 16C.

Turning finally to FIG. 8, four mutually-staggered and hence interlocked layers of elements 16 are also shown in this example, like the arrangement in FIG. 7. However in this case, as in FIG. 6a, the elements 16 are all of substantially equal diameter. Consequently, there are increasing circumferential gaps between the elements 16 of the second to fourth layers in radially outward sequence. However, the elements 16 of the first, innermost layer abut their neighbouring elements 16 in that layer. Also, in arrangements where the neighbouring layers are not staggered, elements 16 of equal diameter could abut their neighbouring elements 16 in all layers if the number of elements in outer layers is increased to close circumferential gaps between them.

FIG. 8 exemplifies various possible configurations of the thermally insulating elements 16A and the mechanically-resistant reinforcing elements 16B. It does so in the context of a spacer formation 42. In this example, the spacer formation 38 is formed of two types of reinforcing elements 16B, namely thick-walled tubes 1661, which could be made of extruded polymer or metal, and solid rods 1662, which could be made of extruded polymer.

The insulating elements 16A shown in FIG. 8 are: hollow, gas-filled thin-walled tubes 16A1, which could be made of extruded polymer; thin-walled tubes 16A2, which could also be made of extruded polymer but are filled with thermal insulation material such as an aerogel; solid rods 16A3 of thermally insulating material such as a polymer foam; and elements 16A4 of a fibrous thermally insulating material such as a braid, a yarn or a rope.

FIG. 8 also shows the possibility that a spacer formation 42 could be formed of a hybrid or mixture of insulating elements 16A and reinforcing elements 16B. Here, a core of insulating elements 16A1 lies within an outer wall of reinforcing elements 16B1 and 16B2, further to restrict heat transfer across the annulus 34.

Many other variations are possible within the inventive concept. For example, relative rotational movement between the pipeline 12 and the reels 18 of the winding machine 14 could instead, or additionally, be effected by turning the pipeline 12 about the central longitudinal axis 24.

Whilst, in the above examples, the pipeline 12 moves past stationary equipment comprising the reels 18, guides 20 and supports 22, it would be possible instead for that equipment to move past a stationary pipeline 12. Similarly, it would be possible for the outer pipe 26 of a PiP arrangement to be advanced over a stationary pipeline 12, or to be assembled around the pipeline 12.

The invention claimed is:

1. A pipe in pipe assembly, comprising:
a bundled infill structure occupying an annulus between inner and outer pipes of the assembly, the infill structure being formed of a plurality of elongate elements laid along the inner pipe;
wherein the elongate elements of the infill structure comprise a mixture of reinforcing elements and insulating elements, the reinforcing elements having greater mechanical resistance than the insulating elements to radial compression whereas the insulating elements provide greater thermal insulation than the reinforcing elements; and
pluralities of the reinforcing elements are positioned together within the infill structure to form discrete reinforcing formations that are circumferentially embedded between insulating regions of the infill structure defined by pluralities of the insulating elements, wherein the reinforcing formations are spacer formations that are angularly spaced around the inner pipe and that extend radially from the inner pipe toward the outer pipe.

2. The assembly of claim 1, wherein the infill structure comprises layers of the elongate elements laid on the inner pipe in radially outward succession.

3. The assembly of claim 2, wherein the elongate elements of each layer are angularly staggered relative to the elongate elements of each neighbouring layer.

4. The assembly of claim 2, wherein the reinforcing formations incorporate fewer reinforcing elements in successive layers to taper in a radially outward direction.

5. The assembly of claim 1, wherein the spacer formations each comprise a combination of the reinforcing elements and the insulating elements.

6. The assembly of claim 1, wherein the elongate elements of the infill structure further comprise one or more auxiliary elements whose primary purpose is to heat the inner pipe or to convey electrical current or data along the assembly.

7. The assembly of claim 6, wherein one or more of the auxiliary elements is a heating element that is in thermal contact with the inner pipe and is surrounded by insulating elements of the infill structure.

8. The assembly of claim 6, wherein one or more of the auxiliary elements are a data cable that is separated from the inner pipe and from any heating element by at least one insulating element or reinforcing element of the infill structure.

9. The assembly of claim 1, wherein the elongate elements lie on mutually parallel paths.

10. The assembly of claim 1, wherein the elongate elements lie on helical paths.

11. The assembly of claim 1, wherein the elongate elements comprise groups of elements braided, knitted, wrapped, twisted, bonded or fused together.

12. The assembly of claim 1, wherein the reinforcing elements comprise tubes or rods.

13. The assembly of claim 1, wherein the insulating elements comprise hollow tubes, tubes filled with thermally insulating material, solid rods of thermally insulating material, or elements of a fibrous thermally insulating material.

14. The assembly of claim 13, wherein the reinforcing elements and the insulating elements are both tubular and the tubes of the insulating elements have thinner walls than the tubes of the reinforcing elements.

15. The assembly of claim 1, wherein the elongate elements of the infill structure are all of substantially the same diameter.

16. The assembly of claim 1, wherein the elongate elements of the infill structure increase in diameter in a radially outward direction.

17. The assembly of claim 1, wherein the reinforcing formations extend through a full radial thickness of the infill structure.

18. The assembly of claim 1, comprising a circumferentially continuous radial gap between the infill structure and the outer pipe.

19. A method of manufacturing a pipe in pipe assembly, the method comprising:
forming a bundled infill structure around an inner pipe of the assembly by laying a plurality of elongate elements along the inner pipe; and
inserting the inner pipe and the infill structure into an outer pipe of the assembly, the infill structure then occupying an annulus defined between the inner and outer pipes; wherein
the elongate elements of the infill structure comprise a mixture of reinforcing elements and insulating elements, the reinforcing elements having greater mechanical resistance than the insulating elements to radial compression whereas the insulating elements provide greater thermal insulation than the reinforcing elements; and
the reinforcing elements are placed together within the infill structure to form discrete reinforcing formations, each of those formations comprising a plurality of the reinforcing elements and being circumferentially embedded between insulating regions of the infill structure defined by pluralities of the insulating elements, wherein the reinforcing formations are spacer formations that are angularly spaced around the inner pipe and that extend radially from the inner pipe toward the outer pipe.

20. The method of claim 19, wherein the infill structure comprises layers of the elongate elements laid on the inner pipe in radially outward succession.

21. The method of claim 20, wherein the reinforcing formations are tapered in a radially outward direction by incorporating fewer reinforcing elements in successive layers.

22. The method of claim 19, wherein the elongate elements of the infill structure further comprise one or more auxiliary elements whose primary purpose is to heat the inner pipe or to convey electrical current or data along the assembly.

23. The method of claim 22, comprising laying at least one heating element in thermal contact with the inner pipe and laying insulating elements over and surrounding the at least one heating element.

24. The method of claim 22, comprising laying at least one data cable on at least one inner layer of elongate elements disposed between the data cable and the inner pipe.

25. The method of claim 19, comprising laying the elongate elements on parallel paths.

26. The method of claim 19, comprising laying the elongate elements on helical paths.

27. The method of claim 19, comprising laying the elongate elements on the inner pipe dispensed from at least one reel of a winding machine.

28. The method of claim 27, comprising laying the elongate elements successively on the inner pipe at positions spaced longitudinally along the inner pipe.

29. The method of claim 27, comprising laying a plurality of the elongate elements grouped together at a common longitudinal position on the inner pipe.

30. The method of claim 29, wherein the elongate elements are grouped by convergence from respective reels to the common longitudinal position on the inner pipe.

31. The method of claim 29, wherein the elongate elements are grouped before being conveyed together to the inner pipe as a group.

32. The method of claim 19, comprising compacting the infill structure by heating and/or radially inward compression before inserting the inner pipe and the infill structure into the outer pipe.

* * * * *